R. B. FAGEOL.
BUMPER SUPPORT FOR MOTOR VEHICLES.
APPLICATION FILED DEC. 30, 1920.
1,405,676.
Patented Feb. 7, 1922.
3 SHEETS—SHEET 1.
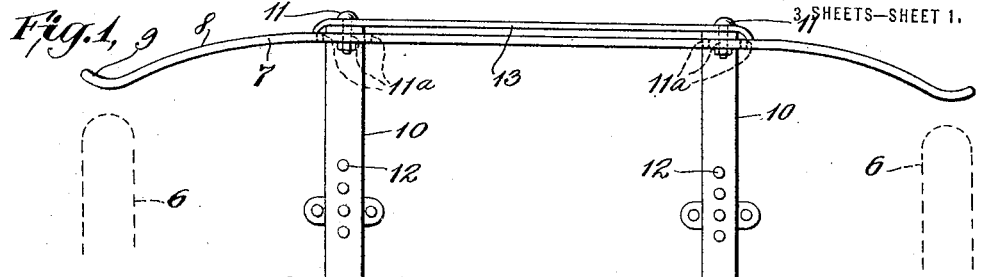
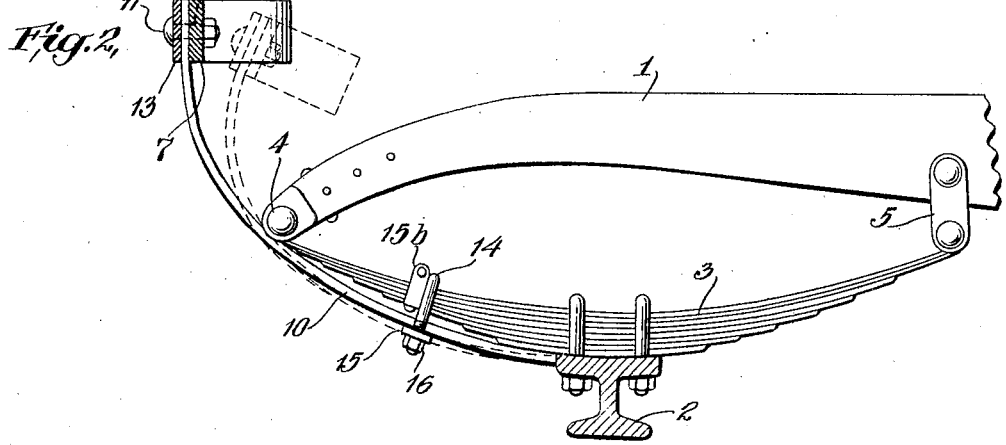
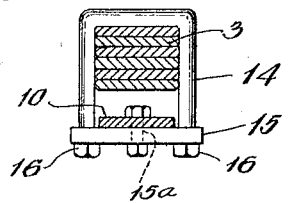
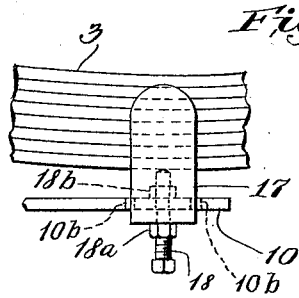
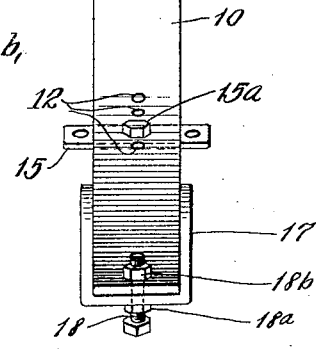
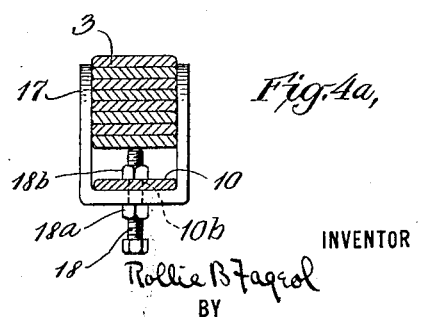
INVENTOR
Rollie B Fageol
BY
Frederick S. Duncan, ATTORNEY

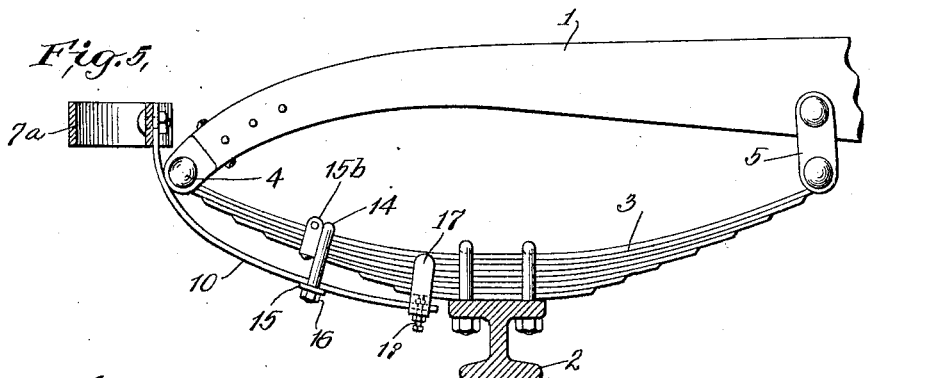
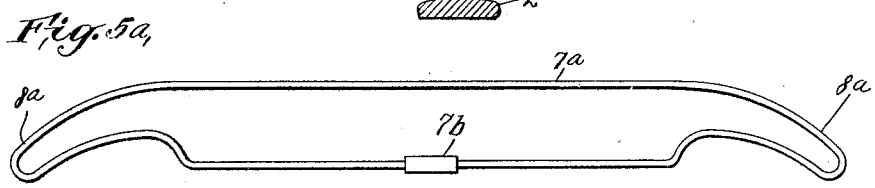
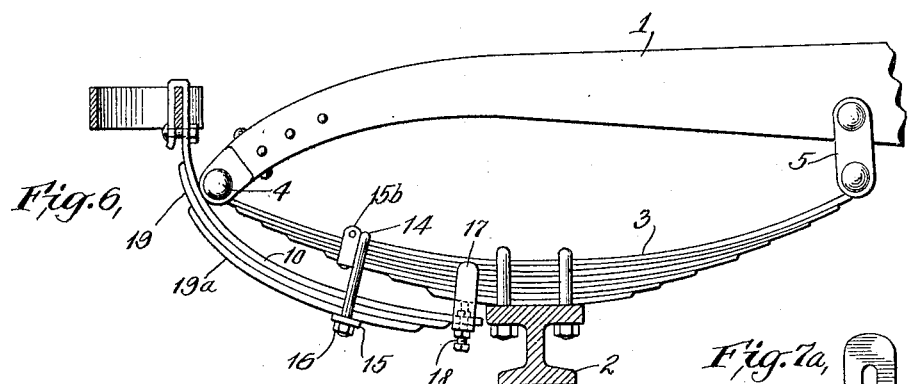
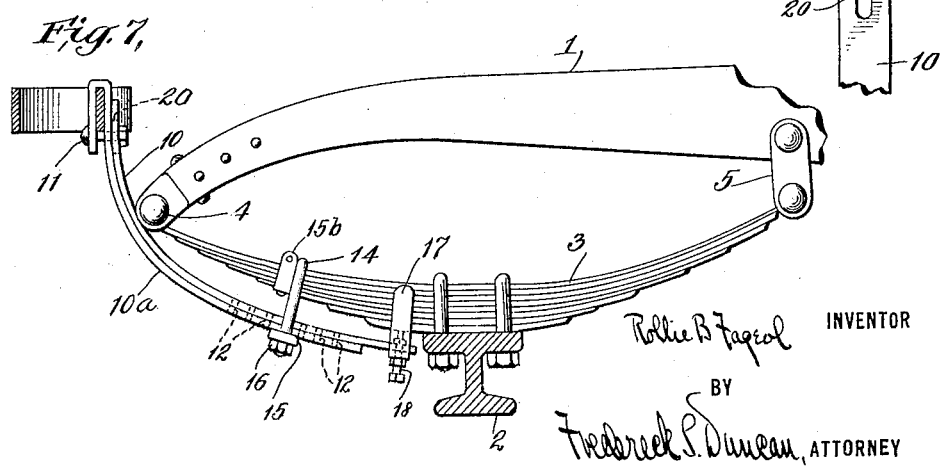

R. B. FAGEOL.
BUMPER SUPPORT FOR MOTOR VEHICLES.
APPLICATION FILED DEC. 30, 1920.
1,405,676.
Patented Feb. 7, 1922.
3 SHEETS—SHEET 3.
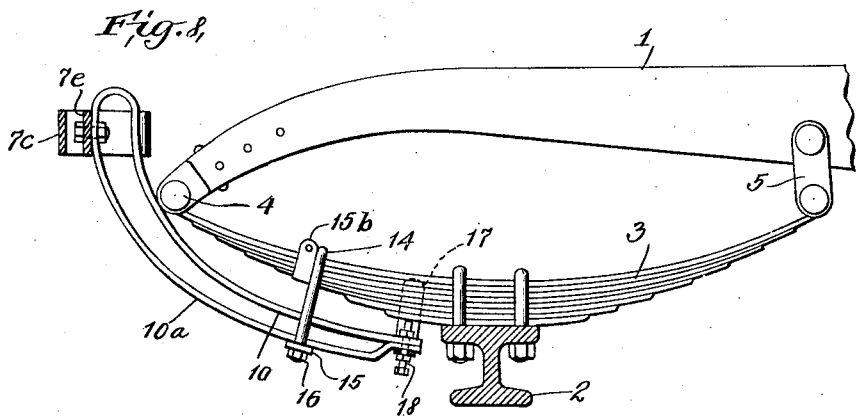
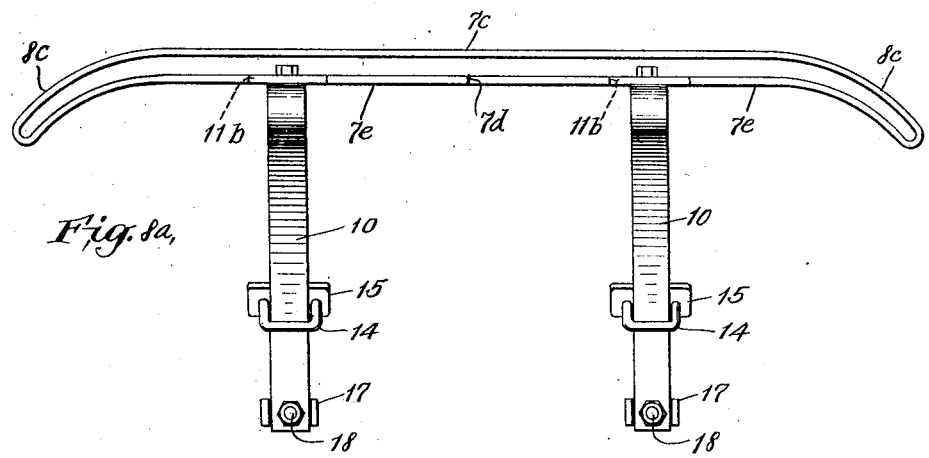
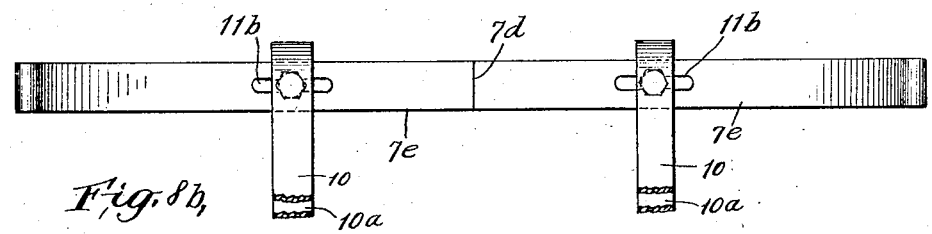
Rollie B Fageol INVENTOR
BY
Frederick S. Duncan ATTORNEY

UNITED STATES PATENT OFFICE.

ROLLIE B. FAGEOL, OF OAKLAND, CALIFORNIA.

BUMPER SUPPORT FOR MOTOR VEHICLES.

1,405,676.  Specification of Letters Patent.  Patented Feb. 7, 1922.

Application filed December 30, 1920. Serial No. 433,984.

*To all whom it may concern:*

Be it known that I, ROLLIE B. FAGEOL, a citizen of the United States, residing at Oakland, in the county of Alameda, in the State of California, have invented certain new and useful Improvements in Bumper Supports for Motor Vehicles, of which the following is a specification.

Motor driven vehicles as at present manufactured are provided particularly at the front end thereof with attachments and refinements, such as splash pans, mud guard flanges and the like, which seriously interfere with the neat and ready attachment or mounting of bumper bars at the front end of the vehicle.

The present invention relates to an improved mounting or means for attachment of a bumper bar to one end of a motor driven vehicle without in any manner interfering with the refinements and factory equipment supplied with the vehicle, and the same consists primarily in a member disposed preferably longitudinally beneath the vehicle spring and held upon and under the same by suitable means whereby a spring support is provided for a bumper bar carried at the free end thereof.

One of the principal objects of the present invention is to provide a yieldable support held preferably beneath the under side of the front vehicle springs and in contact with the front fulcrum point of the springs where the springs attach to the frame, this point of contact affording a fulcrum for the terminal upwardly projecting portion of the flexible member to which is attached the bumper.

A further object is to provide a yieldable mounting for a bumper which is capable of being flexed on the bumper receiving an impact without permanently bending or distorting the normal position of said connection.

A further object is to provide a yieldable mounting for a bumper which is capable of being flexed on the bumper receiving an impact without permanently bending or distorting the normal position of said connection.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Fig. 1 is a view in plan of a bumper illustrating one form of my improved attaching means adjacent the ends thereof and removed from the vehicle.

Fig. 2 is a view in side elevation of the front portion of a vehicle frame with the improved attaching member mounted in connection therewith, and in solid lines disclosing the normal curvature of the attaching member.

Fig. 3 is a view in side elevation of the U-bolt and U-bolt plate used for holding the bumper support in connection with the springs of the automobile, showing the springs and the bumper support in cross section.

Fig. 4 shows in side elevation, and Figs. 4ª and 4ᵇ in end elevation, a form of clip that may be used to maintain the position of the end of my bumper support in line with the springs of the automobile.

Fig. 5 shows in side elevation a modification of my device as applied to a frame of an automobile, and Fig. 5ª shows in plan view a form of spring bumper bar suitable for use with the form of bumper support shown in Fig. 5.

Fig. 6 shows in side elevation a modification of my bumper support connected to the frame of the automobile.

Fig. 7 shows in side elevation another modification of my bumper support as applied to the frame of an automobile, and Fig. 7ª a detail of the same, Figs. 8 and 8ª show in side elevation and in plan view another modification of my device with a form of bumper suitable therefor.

Figure 8ᵇ is a rear view of the bumper shown in Figure 8ª with the rear ends of the supporting arms removed.

Referring more particularly to the drawings, wherein like characters of reference designate corresponding parts, 1 indicates the front portion of the vehicle side frame member, 2 the front vehicle axle and 3—3 the leaf springs resting on the axle 2 and yieldably supporting the frame, one end of each spring being connected by the bolt 4 with the extreme front end of the frame and the pivoted shackle 5 connecting the rear end of the spring with the frame.

Disposed transversely of the end of the vehicle frame, preferably in advance of the front end thereof, and of a length to terminate approximately in line with the outside of the vehicle wheels 6 is a flexible flat spring steel bumper bar 7. The central portion of the bumper bar is preferably positioned edgewise relatively to the vehicle with one side facing the front of the vehicle and the center portion of the bumper bar is substantially straight and the end portions are slightly bowed or curved as at 8 rearwardly toward the vehicle wheels, the terminal ends of the curved portions 8 being forwardly bent as at 9 providing a portion at each end of the bumper which will enable a member engaging in rear of the bumper to slide therefrom on the forward bending of the bumper bar ends.

The bumper bar is attached to the vehicle preferably by the following means. A pair of mounting members 10, each preferably constructed of flat relatively thin spring steel stock are secured at their forward terminal ends to the front face of the relatively straight portion of the bumper 7 by bolts 11 and depend downwardly below the lower edge of the bumper bar 7, preferably at right angles thereto. The members 10 are preferably provided with a set spring curve of a curvature less than that of the curvature of the forward half of the front vehicle springs 3, as indicated in dotted lines, Fig. 2 of the drawings. Said members 10 are preferably of a length greater than that of the forward half of the front vehicle springs 3 to provide a portion to lie beneath the forward portion of the front vehicle springs 3 and a portion to project upwardly above the attaching point 4 of the vehicle springs 3 and frame 1, indicated in full lines in Fig. 2 of the drawings.

The inner or body portion of each attaching member 10 is preferably formed with a plurality of aligned apertures 12, Fig. 1 of the drawings, and connecting the upper terminal ends of the opposite members 10, and providing a finishing member for extending parallel with the relatively straight central portion of the bumper bar there may be provided a finishing strip 13 preferably held in front of the central portion of the bumper bar 7 in spaced relation thereto by the attaching bolts 11 which pass therethrough and through the upper ends of the members 10 and through the bar 7.

In mounting this improved attaching member to the vehicle and to provide a relatively rigid spring support for the bumper bar, one of said members 10 is positioned beneath the forward half of each front spring 3 preferably with its inner end contacting with the front surface of the axle 2, Fig. 2 of the drawings or some similar abutment on the frame of the vehicle. The members 10 are disposed in line with and beneath the front half of the respective front vehicle springs 3 with a portion or point contacting with the frame and springs adjacent the member 4 which provides a fulcrum point for the terminal upwardly projecting portion of said members 10. The inner end of the members 10 are adapted directly or indirectly by means of a clip or other part attached to the member 10 to bear upon the springs 3.

Suitable means are used for connecting the members 10 to the springs 3, preferably adjustably. In the form shown on the drawings, a U-bolt 14 is passed around each of the respective forward halves of the front springs 3 approximately midway of their length and the ends thereof are extended through a connecting plate 15 lying beneath the respective members 10. Securing nuts 16 are then drawn upwardly on the members 14 to place the portion of the members 10 lying beneath the front half of the front vehicle springs 3 under tension and move the same preferably from dotted lines to full lines—Fig. 2 of the drawings. This drawing action or tightening of the U-bolt 14 forces the upwardly extending curved ends of the members 10 attached to the bumper 7 outwardly from dotted to full lines—Fig. 2 of the drawings.

It will be apparent that the forward edge of the axle 2 provides an abutment for the rear end of the attaching members 10, and the tightening of the U-bolt 14 controls the spring tension under which said members 10 are placed. The spring tension of the portion of the members 10 between the front of the axle 2 and the members 4 strengthens or adds to the tension of the forward half of the main vehicle spring 3.

The connecting plate 15 is preferably provided with a stud or pin 15ª for reception within one of the apertures 12 of its associated member 10. This construction provides a means for positioning the U-bolt 14 at various points longitudinally of the vehicle spring to bear in the rear of the usual spring clip 15ᵇ, and at the same time to permit the stud or pin 15ª on the connecting plate 15 to be received in one of the apertures 12 and thus preclude the working of the member 10 toward the end of its associated springs 3. The positioning of the inner end of the members 10 in contact with an abutment, as, for example, the axle 2, precludes the lingitudinal sliding movement of the member in one direction relatively to the springs 3 and the positioning of the U-bolt 14 in rear of the spring clip 15ᵇ and uniting the same through the plate 15, pin 15$^a$ and aperture 12 with the associated members 10, retains the members 10 from longitudinal movement on the springs in the other direction.

It will be observed that by providing a plurality of openings 11$^a$ in the bar 7, one type of bar is capable of serving for use in connection with vehicles of various widths.

17 is a retaining clip that may, if desired, be used to hold the inner end of the bumper arm in position relative to the springs 3 even in case the bumper be subjected to shock at an angle to the frame of the automobile. As illustrated, this clip is of a U-shape, adapted to enclose the end of the bumper arm 10 and having side pieces adapted to extend on each side of the springs 3. The bottom of the clip is provided with a hole through which projects the bolt 18, which also when in position projects through a corresponding aperture 10$^b$ in the bumper arm 10. This bolt is provided with two lock nuts 18$^a$ and 18$^b$, one on the outside of the clip and the other on the inside of the clip and of the arm 10. The end of the bolt 18 is adapted to bear upon the lower side of the springs 3 when the bolt is screwed into its operative position. This clip prevents the inner end of the supporting arm 10 from being thrown off of the springs 3 when the bumper bar is subjected to angular shock and also correspondingly holds the forward position of the arm 10 in position upon the fulcrum or bearing point 4 during such angular shock on the bumper bar.

In some of the forms of my device illustrated in the drawings, the forward end of the bumper support 10 is shown as extending a considerable distance beyond the fulcrum 4, but if desired, this forward position of the supporting arm 10 may be made shorter as shown in Fig. 5, and, if desired, in such a case a different form of bumper bar, such as shown in Fig. 5$^a$, may be used, which form of bumper bar has greater resiliency than that shown in Fig. 1 and tends to make up for the somewhat lessened resiliency of the shorter supporting arm 10 shown in Fig. 5 as compared with the longer supporting arm 10 as shown in Fig. 2.

It should be understood that any suitable or desirable form of bumper bar may be used in connection with my device, as for example, the bumper bar shown in Fig. 5$^a$, which consists of a single strip of flat spring steel so bent as to include a forward lateral bumper bar 7$^a$ with laterally extending recurved loop ends 8$^a$, the interior ends of such strip being preferably brought together and joined by a sleeve or other connecting member 7$^b$. In Figs. 8 and 8$^a$ I have shown a bumper bar specially adapted for use with the supporting members there shown, the bumper bar consisting of a single strip of spring steel bent so as to provide a forward lateral bumper bar 7$^c$ with recurved loop ends 8$^c$ and with the ends of the spring steel strip meeting at 7$^d$ at the rear of the middle of the forward bumper bar, and the rear portions 7$^e$ 7$^e$ being provided with slots 11$^b$ 11$^b$ through which the attaching bolts 11, 11 may pass.

It should also be understood that my invention may be embodied in various modified forms of bumper supporting device. In Fig. 6 I have illustrated the use with my bumper support of two spring leaves 19 and 19$^a$ which may be desirable in those cases where the construction of the springs is such that the U-bolt is located a considerable distance back from the bolt or fulcrum 4, in which case the spring leaves 19 and 19$^a$ will tend to hold the supporting arm 10 in close contact with the fulcrum 4 and prevent rattling and chattering during the motion of the car. This construction also permits use of a heavier bumper bar.

In Fig. 7 I have illustrated in connection with the supporting arm 10 an auxiliary spring arm 10$^a$, said arms together performing the function of the arm 10 but giving greater strength and resistance than a single arm. When this double arm construction is used the inner arm 10 is preferably provided with an adjusting slot 20 near its outer end, through which and through a corresponding aperture in the arm 10$^a$ extends the bolt 11 for securing the bumper bar to the supporting arm. Both the inner arm 10 and the outer arm 10$^a$ are provided with the adjusting holes or apertures 12 through which may project the pin or bolt 15$^a$. By reason of the slot 20 and the adjusting holes 12, the double supporting arm 10 and 10$^a$ may be lengthened or shortened as may be desired in special instances.

In Figs. 8 and 8$^a$, I have shown another form of reinforced supporting member in which the reinforcing member 10$^a$ is a recurved portion of the member 10, in which case if the clip 17 is used apertures 10$^a$ may be made in the inner ends of both members 10 and 10$^a$ and the apertures 12 may be made in the member 10$^a$. The various forms of reinforcing members serve to strengthen the supporting members as a whole and either to hold the member 10 in close contact with the out end of the springs or to increase the resistance of that portion of the supporting member that projects beyond the springs 3 or both.

It will be apparent that the bumper herein described is capable of being readily positioned on and removed from a vehicle and of being manufactured at a small cost.

Other modifications of my invention will readily suggest themselves to persons skilled in the art without departing from the spirit of my invention, and I do not, therefore, intend to limit myself to the particular modifications or details herein illustrated or described, but what I claim as my invention is as follows:

In all of the forms of bumper bars shown herein the shock of impact will be transmitted to the main frame in such a way as to be resisted by the weight thereof. In other words there will be a tendency to lift the main frame off the suspension springs. For this reason unusual strains are not imparted to the vehicle and there is little danger of breaking any vital part thereof in the event of a collision.

Claims.

1. A motor vehicle bumper bar support consisting of elongated spring members with body portions and inner ends adapted to be positioned beneath and along the outer portion of the vehicle leaf springs and with bumper supporting ends adapted to extend upwardly beyond the outer ends of the springs, and means for securing the members to the under side of said vehicle springs.

2. A motor vehicle bumper bar support including a pair of elongated bent members of spring material the outer ends of which are adapted to receive and hold a bumper bar disposed transversely to the front of a vehicle and in spaced relation above and before the outer end of the vehicle springs and the inner portions of said supporting members being adapted to extend longitudinally of and beneath the vehicle springs respectively, and means associated with each member for retaining the same in position upon the under side of the vehicle springs.

3. A motor vehicle bumper bar support including a pair of elongated bent members of spring material, the outer ends of which are adapted to receive and hold a bumper bar and the inner ends of which are adapted to extend longitudinally of and beneath the vehicle springs respectively, one portion of each of such supporting members being adapted to bear upon the outer end of the vehicle springs and another portion near the inner end of such supporting member being adapted to bear upon the under side of the vehicle springs, and means associated with each member for retaining the same in position upon the under side of the vehicle springs.

4. A motor vehicle bumper bar support comprising a pair of elongated bent members of spring material, the outer ends of which are adapted to receive and hold a bumper bar and the inner portions of which are adapted to extend longitudinally of and beneath the vehicle springs respectively, one portion of each such supporting member being adapted to bear upon the outer end of the vehicle springs and another portion near the inner end of such supporting member being adapted to bear upon the under side of the spring, and means located between said bearing points for retaining each of said supporting members in position upon the under side of the vehicle springs.

5. A motor vehicle bumper bar support comprising a pair of elongated bent members of spring material, the outer ends of which are adapted to receive and hold a bumper bar and the inner portions of which are adapted to extend longitudinally of and beneath the vehicle springs, one portion of each such supporting member being adapted to bear upon the outer end of the vehicle springs and another portion near the inner end of such supporting member being adapted to bear upon the under side of the springs, securing means for holding such supporting member upon the under side of the vehicle springs and means for securing together such supporting member and said securing means.

6. A motor vehicle bumper bar support comprising a pair of elongated bent members of spring material, the outer ends of which are adapted to receive and hold a bumper bar and the inner portions of which are adapted to extend longitudinally of and beneath the vehicle springs, one portion of each supporting member being adapted to bear upon the outer end of the vehicle springs and another portion near the inner end of such supporting member being adapted to bear upon the under side of the springs, adjustable securing means for holding such supporting members upon the under side of the vehicle springs and means for securing together such supporting member and said securing means.

7. A motor vehicle bumper bar support comprising a pair of elongated bent members of spring material, the outer ends of which are adapted to receive and hold a bumper bar and the inner portions of which are adapted to extend longitudinally of and beneath the vehicle springs, one portion of each such supporting member being adapted to bear upon the outer end of the vehicle springs and another portion near the inner end of such supporting member being adapted to bear upon the under side of the springs, securing means for holding such supporting member upon the under side of the vehicle springs and means for adjustably securing together such supporting member and said securing means.

8. A motor vehicle bumper bar support comprising a pair of elongated bent members of spring material, the outer ends of which are adapted to receive and hold a bumper bar and the inner portions of which are adapted to extend longitudinally of and beneath the vehicle springs, one portion of each such supporting member being adapted to bear upon the outer end of the vehicle springs and another portion near the inner end of such supporting member being adapted to bear upon the under side of the springs and a U-bolt and retaining plate co-operating with each supporting member and adapted to engage the vehicle springs and the supporting member and hold said supporting member in position upon the under side of said vehicle springs.

9. A motor vehicle bumper bar support comprising a pair of elongated bent members of spring material, the outer ends of which are adapted to receive and hold a bumper bar and the inner portions of which are adapted to extend longitudinally of and beneath the vehicle springs, one portion of each such supporting member being adapted to bear upon the outer end of the vehicle springs and another portion near the inner end of such supporting member being adapted to bear upon the under side of the spring each of said supporting members being provided with a series of apertures at a point intermediate the outer end of the vehicle springs and the inner end of the supporting members, a retaining member for each supporting member adapted to engage the supporting member and the springs and hold the supporting member in fixed relation to the springs each of said retaining members being provided with an aperture and a bolt adapted to pass through said aperture and through one of the apertures in such supporting member whereby said supporting member and said retaining means may be adjustably secured together.

10. A motor vehicle bumper bar support consisting of elongated spring members with bumper supporting outer portions adapted to extend upwardly beyond the outer ends of the springs of the vehicle and with body portions and inner ends adapted to be positioned beneath and along the outer portion of the vehicle springs, means for securing each supporting member to the under side of said vehicle springs at a point intermediate the outer end of said springs and the inner end of said supporting member and means for holding the inner end of each supporting member in parallel relation to said vehicle springs.

11. A motor vehicle bumper bar support consisting of elongated spring members with bumper supporting outer portions adapted to extend upwardly beyond the outer ends of the springs of the vehicle and with body portions and inner ends adapted to be positioned beneath and along the outer portion of the vehicle springs, means for securing each supporting member to the under side of said vehicle springs at a point intermediate the outer end of said springs and the inner end of said supporting member and a retaining clip secured to each supporting member near its inner end and having side members extending upwardly along each side of the vehicle springs.

12. A motor vehicle bumper bar support consisting of elongated spring members with bumper supporting outer portions adapted to extend upwardly beyond the outer ends of the springs of the vehicle and with body portions and inner ends adapted to be positioned beneath and along the outer portion of the vehicle springs, means for securing said supporting members upon the under side of said vehicle springs and means adjustably mounted on each supporting member near its inner end for holding such inner end in parallel relation to the vehicle springs.

13. A motor vehicle bumper bar support including a pair of elongated members of spring material provided with a curved body and a bumper supporting end fashioned to curve upwardly beyond and project above the outer end of the vehicle spring, the curvature of the body portion being greater than that of the normal set of the vehicle spring whereby the curved body portion is spaced within its length from the springs at one point and means associated with the portion of the supporting member spaced from the springs for drawing the supporting members toward the underside of the vehicle springs and for maintaining the same under tension relative to the springs and in position on the under side of said springs.

14. A motor vehicle bumper bar support including a pair of elongated flat spring members provided with a curved body and a bumper supporting end fashioned to extend upwardly over the outer end of the vehicle spring, the curvature of each body being of a degree greater than the normal set of its associated spring, said supports being adapted for positioning longitudinally beneath the vehicle springs with the faces lying in a line with the lower faces of the vehicle springs and with the bumper supporting ends projecting above the terminal ends of the spring and means for drawing the body of said members toward the springs with each of said bodies contacting with its associated springs at a plurality of points.

15. A motor vehicle bumper bar consisting of elongated flat spring members with their body portions and inner ends adapted to be positioned beneath and along the outer portion of the vehicle leaf springs and with the bumper supporting ends adapted to extend upwardly beyond the outer ends of the springs and means for securing the members to the under side of said vehicle springs.

16. A vehicle bumper support including a pair of elongated bent members of spring material the outer ends of which are adapted to receive and hold a bumper bar disposed transversely to the front of the vehicle and in spaced relation above and before the outer end of the vehicle springs and the inner portions of which are adapted to extend longitudinally of and beneath the vehicle springs, and means associated with each member for retaining the same in position upon the under side of the respective vehicle springs, and a spring reinforcing member co-operating with each supporting member.

17. In combination with a vehicle bumper bar, a pair of supporting members extended therefrom, consisting of a pair of elongated flat spring members adapted to be positioned beneath and parallel with the outer half of the vehicle springs and to extend along the same, with the bumper mounting end projecting upwardly and beyond the outer end of the springs, and means for securing the supporting members in position whereby on an impact being delivered to the bumper the bumper mounting ends of the supporting members fulcrum on the outer ends of said springs.

18. In combination with a vehicle bumper bar, a pair of supporting members extended therefrom, consisting of a pair of elongated members adapted to be positioned beneath and parallel with the outer half of the vehicle springs and to extend along the same with the bumper mounting end projecting upwardly and beyond the outer end of the springs and the opposite end contacting with an abutment on the springs of the vehicle and means for securing the supporting members in position whereby on an impact being delivered to the bumper the bumper mounting ends of the supporting members fulcrum on the outer ends of said springs.

19. In combination with a vehicle bumper bar a pair of elongated yieldable supporting members attached thereto and extending downwardly therefrom, said supporting members being curved from the rear face of the bumper bar, the radius of the curve of said members being greater at a point distant from said point of attachment of the supporting members with the bumper bar.

20. In combination with a vehicle bumper bar, a pair of long flat yieldable supporting members attached thereto and extending downwardly therefrom, said supporting members being curved from the rear face of the bumper bar, the radius of the curve of said members increasing from the point of attachment thereof with the bumper bar toward the other ends of said supporting members.

21. In combination, a pair of elliptical vehicle springs, a support connecting the same, a vehicle bumper bar disposed transversely of one end of the vehicle, a pair of supporting members connected therewith and extended therefrom, said members each comprising a long yieldable body curved rearwardly from the rear of the bumper and each adapted for extending beneath one of the vehicle springs with their bumper supporting ends projecting upwardly beyond the outer end of the vehicle springs and in contact therewith, and means associated with the portion of the members lying beneath the springs and connecting with the springs for drawing that portion of the members lying beneath the springs toward the same to maintain a point of contact between the respective members and their associated springs at the point of projection of the members beyond said springs.

22. In combination, a pair of elliptical vehicle springs, a support connecting the same, a vehicle bumper bar disposed transversely of one end of the vehicle, a pair of supporting members connected therewith and extended therefrom, said members each comprising a long yieldable body curved rearwardly from the rear of the bumper and each adapted for extending beneath one of the vehicle springs with their bumper supporting ends projecting upwardly beyond the outer end of the vehicle springs and in contact therewith, and means associated with the portion of the members lying beneath the springs and connecting with the springs for drawing that portion of the members lying beneath the springs toward the same to maintain a point of contact between the respective members and their associated springs at the point of projection of the members beyond said springs, and means for maintaining the inner end of said supporting member in parallel relation to its associated vehicle springs.

23. In combination, a pair of elliptical vehicle springs, a support connecting the same, a vehicle bumper bar disposed transversely of one end of the vehicle, a pair of supporting members connected therewith and extended therefrom, said members each comprising a long yieldable body curved rearwardly from the rear of the bumper and each adapted for extending beneath one of the vehicle springs with the inner end in contact with an abutment on said vehicle and with their bumper supporting ends projecting upwardly beyond the outer end of the vehicle springs and in contact therewith, and means associated with the portion of the members lying beneath the springs and connecting with the springs for drawing that portion of the members lying beneath the springs toward the same to maintain a point of contact between the respective supporting members and their associated springs at the point of projection of the members beyond said springs.

24. In combination with a vehicle bumper, means for securing the same to a vehicle, the same comprising a pair of longitudinally curved elongated yieldable members each adapted to be disposed longitudinally of and under a vehicle spring, with their free ends curved upwardly from the outer end of their respective vehicle springs and connected with the bumper, and means for securing the respective members to their associated springs and for precluding longitudinal movement of the members relative to their associated springs.

25. In combination with a vehicle bumper, means for securing the same to a vehicle, the same comprising a pair of longitudinally curved elongated yieldable members each adapted to be disposed longitudinally of and under a vehicle spring, with their free ends curved upwardly from the outer end of their respective vehicle springs and connected with the bumper, and means for securing the respective members to their associated springs and for precluding lateral movement of the members relative to their associated springs.

26. In combination with a vehicle provided with a pair of vehicle supporting springs of the leaf type each provided with a clip, a bumper bar adapted to be positioned transversely of the end of the vehicle, means for securing the bumper to the vehicle, the same comprising a pair of elongated members of spring material curved at their outer ends for extending upwardly beyond the ends of the vehicle springs and with their bodies lying longitudinally of the under face of said vehicle springs, and means co-acting with the respective bodies and engaging the springs at one side of said clips for retaining the members in position therewith.

27. In combination with a vehicle bumper, means for securing the same to a vehicle, comprising a pair of elongated spring members depending from the bumper intermediate the ends thereof, said members being longitudinally curved throughout their length and adapted to extend parallel with and longitudinally of one face of the vehicle supporting springs, and means for securing the members in position on said springs.

28. In combination with a vehicle bumper, of means for securing the same to a vehicle, the same comprising a pair of elongated spring members depending from the bumper intermediate the ends thereof, said members being longitudinally curved throughout their length and adapted to extend parallel with and longitudinally of one face of the vehicle supporting springs, and means for securing the members in position to extend parallel with and longitudinally of said face of the vehicle supporting springs with a portion adjacent the bumper supporting ends in contact with the ends of the vehicle springs and fulcruming thereon, and means for securing the members in position against the respective springs at points removed from the projecting ends thereof.

29. In a vehicle bumper bar support an elongated resilient body adapted to be placed adjacent a longitudinally disposed leaf support spring on said vehicle and to project beyond the forward end of said spring, and means for attaching said body to said spring at a point intermediate the ends of said body, said body being independent of said spring.

ROLLIE B. FAGEOL.